United States Patent [19]

Townsend

[11] Patent Number: 4,562,575
[45] Date of Patent: Dec. 31, 1985

[54] METHOD AND APPARATUS FOR THE SELECTION OF REDUNDANT SYSTEM MODULES

[75] Inventor: Greg M. Townsend, Palatine, Ill.

[73] Assignee: Motorola, Inc., Schaumburg, Ill.

[21] Appl. No.: 511,701

[22] Filed: Jul. 7, 1983

[51] Int. Cl.$^4$ .............................................. G06F 11/20
[52] U.S. Cl. ........................................ 371/9; 371/36; 371/62
[58] Field of Search .......................... 371/8, 9, 36, 62; 364/187, 200, 900

[56] References Cited

U.S. PATENT DOCUMENTS

| | | | |
|---|---|---|---|
| 3,665,173 | 5/1972 | Bouricius et al. | 371/36 X |
| 3,665,418 | 5/1972 | Bouricius et al. | 364/200 |
| 3,783,250 | 1/1974 | Fletcher et al. | 371/36 |
| 4,200,226 | 4/1980 | Piras | 371/9 |
| 4,405,982 | 9/1983 | Ruhnau et al. | 364/200 |
| 4,497,059 | 1/1985 | Smith | 371/36 |

OTHER PUBLICATIONS

A. D. Ingle et al., A Reliability Model for Various Switch Designs in Hybrid Redundancy, IEEE Trans. on Computers, vol. C-25, No. 2, Feb. 1976, pp. 115–133.

*Primary Examiner*—Charles E. Atkinson
*Attorney, Agent, or Firm*—Thomas G. Berry; Donald B. Southard

[57] ABSTRACT

A method and apparatus for selecting at least one redundant module from a plurality of redundant modules in which the apparatus comprises a plurality of voting devices for monitoring the operation of an active redundant module, each voting device for generating a vote indicating whether or not the active redundant module should remain active and a control device, responsive to the collective vote from the plurality of voting devices, for selecting at least one of the redundant modules to be active. The method comprises the steps of monitoring the operation of the active redundant module with a plurality of voting devices, generating a collective vote from the plurality of voting devices with respect to the operation of the active redundant module and controlling the operation of the redundant modules in accordance with the collective vote.

13 Claims, 6 Drawing Figures

METHOD AND APPARATUS FOR THE SELECTION OF REDUNDANT SYSTEM MODULES

BACKGROUND OF THE INVENTION

1. Field of the Invention

The present invention relates to the automatic selection of at least one of a plurality of redundant common system modules provided to ensure reliable operation of the system, and more particularly, to a method and apparatus in which the diagnostic functions are distributed among a plurality of system components which monitor the operation of the at least one active redundant common system module and select another redundant common system module to become operative in the event a failure in the active redundant common system module is detected by a predetermined number of the system components.

2. Description of the Prior Art

Previously, there were many instances where a single common module might be responsible for controlling the inputs and outputs from a multiplicity of different nodes (i.e., from other types of modules and components) in an entire system. The reliability of this single common module was thus of critical importance in that its failure could result in an entire system failure. Therefore, it became appropriate to provide redundant common modules to prevent the failure of the entire system in the event that one of the common modules fail. When such redundant common modules were utilized, it became necessary to provide for the automatic selection of one of the redundant common modules to ensure that a properly functioning redundant common module was always in operation.

Typically, the automatic selection of one of the redundant common modules has been provided by the application of an independent diagnostic module. The diagnostic module constantly tests the one active redundant common module to ensure that it is functioning properly. In the event of the detection of a malfunction, the diagnostic module would then switch the operation to another presumed properly functioning redundant common module. The diagnostic module also periodically switches the operation from the one active redundant common module to another redundant common module, even if a failure is not detected in the active redundant common module, in order to ensure that the other redundant common modules are indeed functioning properly. This helps to prevent the occurrence of "silent" failures in the redundant common modules, which in the absence of periodic switching, would go undetected until the active redundant common module failed and would thus result in further unreliability of the system.

However, it is readily apparent, that the problem with the use of the diagnostic module is that a new common element of critical importance has been introduced into the system. If the diagnostics module itself should fail, the entire system could also fail just as though there were no redundant common modules. In many cases the complexity and, therefore, the failure rate of the diagnostic module has been greater than the failure rate of the redundant common modules it is testing. Further, the additional cost of the independent diagnostic modules may also be prohibitive.

The present invention overcomes the aforesaid problems by providing a system in which the diagnostic functions are distributed among the several nodes in the system. The nodes in the system control the selection of the redundant common modules by generating votes which indicate their choice.

SUMMARY OF THE INVENTION

Accordingly, one object of the present invention is to provide a novel method and apparatus for the automatic selection of at least one of a plurality of redundant common modules.

It is another object of the present invention to provide a novel method and apparatus which distributes the diagnostic function for at least an active redundant common module among several nodes in a system and then allows a predetermined number of votes to control the selection of at least one of the plurality of redundant common modules.

It is still yet another object of the present invention to provide a method and apparatus for the automatic selection of at least one of a plurality of redundant common modules which reduces the system cost by distributing the diagnostic functions among system components already resident in the system.

Yet another object of the present invention is to provide a novel method and apparatus for the automatic selection of at least one of a plurality of redundant common modules which incorporates a simple, reliable and fail safe circuit means for collecting and responding to the votes from the system nodes.

In order to accomplish the aforementioned objects, the present apparatus for the automatic selection of at least one of a plurality of redundant common system modules comprises a voting means at each node in the system for monitoring the operation of an active redundant common module, each voting means for generating a vote indicating whether or not the operation should be transferred from the active redundant common module to another redundant common module, the vote from each voting means being combined with the votes from the other voting means to provide a collective vote to determine the transfer of the control operation; and a control means, responsive to the collective vote from all of the voting means for controlling the selection of at least one of the plurality of redundant common modules.

One method comprises the steps of monitoring the operation of at least one active redundant common module with a plurality of voting means; generating a collective vote from said plurality of voting means with respect to the operation of said at least one active redundant common module and controlling the selection of at least one of the plurality of redundant modules in accordance with the collective vote.

BRIEF DESCRIPTION OF THE DRAWINGS

A more complete appreciation of the invention and of the attendant advantages thereof will be readily attained as the same becomes better understood by reference to the following detailed description when considered in connection with the accompanying drawings, wherein.

DESCRIPTION OF THE PREFERRED EMBODIMENT

Figure 1:
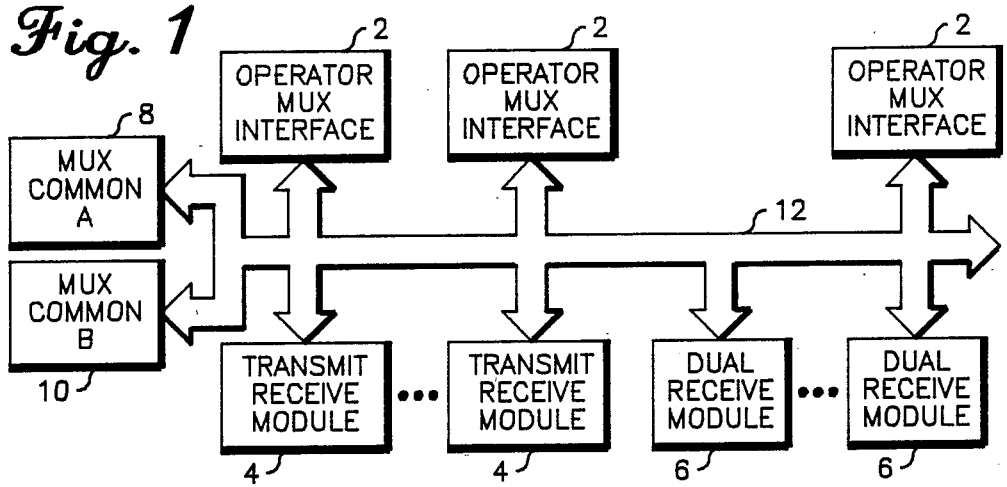
FIG. 1 is a functional block diagram of a communication control system utilizing the present invention.

Referring now to the drawings, wherein like reference numerals designate identical or correspondence parts throughout the several views, and more particularly to FIG. 1 thereof, a communication control center utilizing the present invention is illustrated. The Communication Control Center includes multiple modules of three distinct types which communicate with each other by way of a time division multiplexing (hereinafter referred to as TDM) network. The control center system comprises a plurality of Operator Mux Interface (OMI) modules 2, a plurality of Transmit Receive (TR) modules 4 and a plurality of Dual Receive (DR) modules 6, all of which communicate with each other via the BUS 12 or other acceptable equivalent. Communication between the modules is controlled by a fourth type of module referred to as the MUX common module 8 or 10, which are redundant common modules. The MUX common module 8 and 10 arbitrate access to a shared data channel on the TDM BUS 12 or equivalent and also output synchronization signals necessary for other forms of communication over the network. The MUX common modules are therefore of critical importance to the system since they represent common elements, the failure of which would cause failure of the entire network. Therefore, an extremely reliable mechanism is required to ensure that the MUX common modules 8 and 10 functions do not fail and it becomes necessary to monitor the operation of the active MUX common module 8 or 10 and transfer the operation from the active MUX common module 8 or 10 to the inactive MUX common module 8 or 10 should the active module fail.

Figure 2:
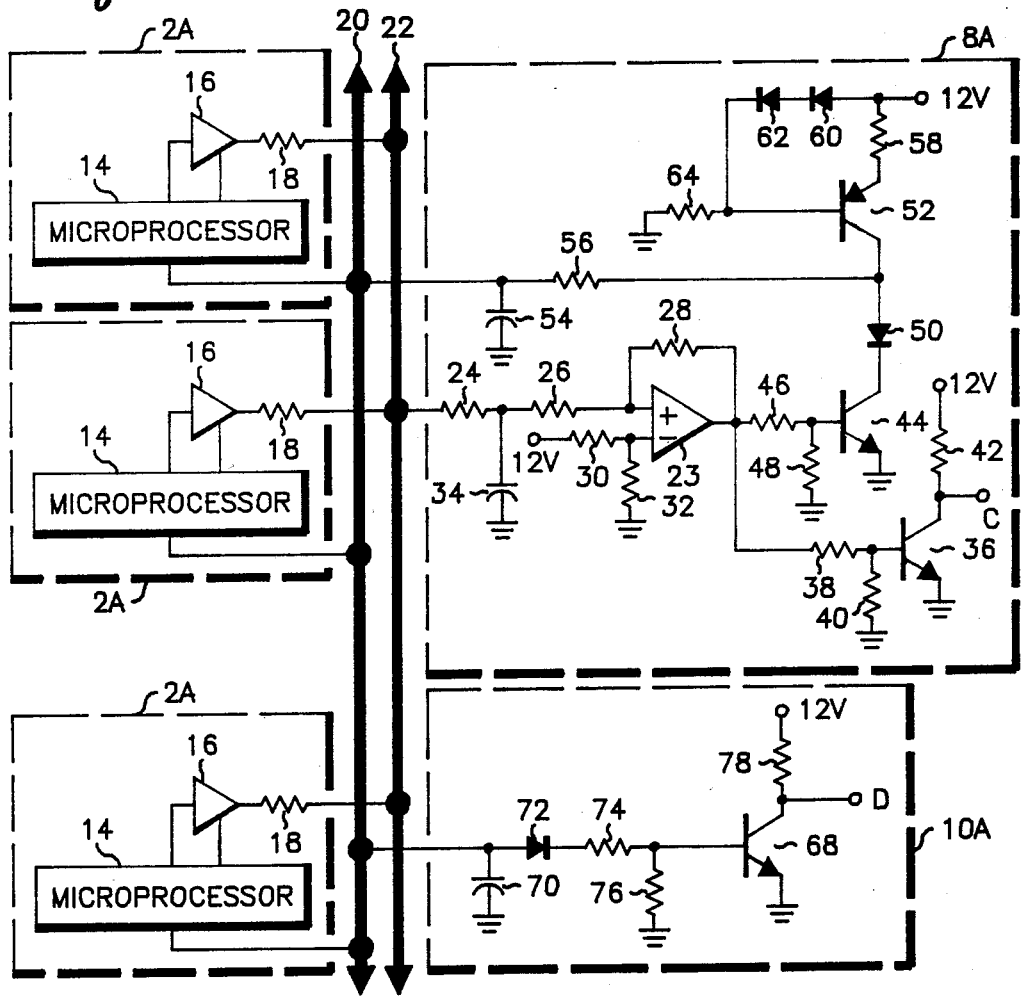
FIG. 2 is a block and electrical schematic diagram illustrating the main elements of the present invention.

Referring now to FIGS. 1 and 2, each of the OMI modules 2 include the elements shown in block 2A of FIG. 2. Each of the blocks 2A include a microprocessor 14, such as an MC68A03 manufactured by Motorola, Inc., having one of its I/O ports connected to the control buffer 16 comprised of a level shifter such as a 74LS05 in series with a tristatable buffer such as an MC14503, both components being manufactured by Motorola, Inc. The control buffer 16 is series connected to the resistor 18 and has its tristate control lead connected to another I/O port of the microprocessor 14. It should be realized that the BUS 12 of FIG. 1 also includes a STATUS BUS line 20 and a VOTE BUS line 22. The STATUS BUS line 20, depending upon its level, indicates which MUX common module 8, 10 is presently active, while the VOTE BUS line 22 provides superposed vote information from all of the microprocessors 14. Each of the resistors 18 is coupled to VOTE BUS line 22 from the several OMI's 2. The MUX common module 8 also includes vote collecting circuitry, status information circuitry, and circuitry to enable and disable the MUX common module 8 as shown in the block 8a. The MUX common module 10 includes the circuitry in block 10a which is used to enable or disable the MUX common module 10 as appropriate. This combined circuitry provides for the selective operation of one of the redundant common modules.

The control of the selection of the redundant MUX common modules 8 and 10 would generally occur as described immediately hereinafter. The responsibility for determining which MUX common module 8 or 10 should control the system is distributed among all of the OMI modules 2 in the system. Resident on each OMI is a microprocessor system 14 which controls the normal operation of the communications network. Each of the microprocessors 14 contains a diagnostic routine which enables it to detect any operational failures in the active MUX common module 8 or 10 which will be described in detail hereinafter. A failure in the active MUX common module 8 or 10 therefore may be independently detected by each OMI module 2 in the system. In response to a failure detection, each OMI module 2 would output a vote signal to switch to the inactive or stand-by MUX common module 8 or 10. Therefore, if a predetermined number (e.g., the majority in the preferred embodiment) of the OMI modules reach the same conclusion, the inactive redundant MUX common module 8 or 10 is selected to become activated. By selecting an appropriate number, the possibility of a single faulty OMI module 2 initiating an improper action may be eliminated.

Referring now to FIG. 2, a detailed description of the present invention will be presented. Each of the OMI modules 2 includes a microprocessor 14 having an output connected to the input of a control buffer 16 which has its output connected to one end of a resistor 18. The other end of the resistor 18 is connected to the VOTE BUS line 22. A second output of the microprocessor 14 is connected to the tristate control lead of the control buffer 16. When the microprocessor 14 holds the control lead at a low logic level, the control buffer 16 couples its input signal through to its output. However, when the microprocessor 14 holds the control lead at a high logic level, the control buffer 16 output appears as a high output impedance in which case the voltage level that appears on the VOTE BUS line 22 is not effected by the control buffer 16, which represents a removal of the OMI 2 from the system. One of the inputs to the microprocessor 14 is connected to the STATUS BUS line 20.

The circuitry shown in block 8a is contained in the MUX common module 8 and includes the comparator 23 which has its positive input terminal connected to the VOTE BUS line 22 through the series resistors 24 and 26. The output of the comparator 23 is connected to the positive input terminal thereof by way of the feedback resistor 28. The negative input terminal of the comparator 23 is connected to a 12 volt power supply through the resistor 30 and to ground through the resistor 32. A capacitor 34 has one end connected to the junction of the resistors 24 and 26 and its other end connected to ground.

The base of the NPN transistor 36 is connected to the output of the comparator 23 through the resistor 38, the base of the transistor 36 also being connected to ground through the resistor 40. The emitter of the transistor 36 is also connected to ground. The collector of the transistor 36 is connected to a 12 volt power supply through the resistor 42 and has a terminal C to enable or disable the remaining circuitry (not shown) of the MUX common module 8. The remaining circuitry is used to control communication between the various other modules as mentioned herein before, the details of which are not necessary for a full and complete understanding of the present invention. The output of the comparator 23 is also connected to the base of NPN transistor 44 through the resistor 46. The base of the transistor 44 is also connected to ground through the resistor 48. The emitter of transistor 44 is also connected to ground. The collector of the transistor 44 is connected to the cathode of the diode 50. A PNP transistor 52 has its collector connected to the anode of the diode 50 and to the STATUS BUS line 20 through the capacitor 54-resistor 56 combination. The emitter of the transistor 52 is connected to the 12 volt power supply through the resistor 58. The base of the transistor 52 is connected to the 12 volt power source through the series diodes 60 and 62 and is also connected to ground through the resistor 64.

The circuitry shown in block 10a is used to enable or disable through the terminal D the remaining circuitry (not shown) of the MUX common module 10 and includes the NPN transistor 68 having its base connected to the STATUS BUS Line 20 through the capacitor 70, diode 72 and resistor 74 combination. Again, it should be realized that the details of the remaining circuitry is not necessary for a full and complete understanding of the present invention. The base of the transistor 68 is also connected to ground through the resistor 76. The collector of the transistor 68 is connected to the 12 volt power source through the resistor 78 and the collector output is also used to enable or disable the remainder of the MUX common module 10 circuitry depending on its value which is connected at the terminal D.

Still referring to FIG. 2, the operation of the present invention will be described. In this example, the STATUS BUS line 20 is at a low logic level when the MUX common A module 8 is active and is at a high logic level when the MUX common B module 10 is active. The STATUS BUS line 20 is driven by the circuit comprised of the transistors 44 and 52 each having their respective associated circuit components. The transistor 52 with its associated bias components 60, 62 and 64 forms a constant current source and has its emitter voltage held at approximately 11.3 volts by the diode 60, the diode 62 and the resistor 64. The emitter current is therefore 0.7 volts divided by the resistance of the resistor 58 and is used to raise the STATUS BUS line 20 to a high logic level through the capacitor 54-resistor 56 combination. When the output of the comparator 23 is at a high logic level, the transistor 44 is turned ON through the resistors 46 and 48 and the current supplied by the transistor 52 is drawn to ground through the transistor 44 and the diode 50. This also pulls the STATUS BUS line 20 to ground. Such a condition indicates that MUX common A module 8 is enabled and that the MUX common B module 10 is disabled. When the output from the comparator 23 is at a low logic level, the transistor 44 is turned OFF which raises the STATUS BUS line 20 to a high logic level. The resistor 56, the capacitor 54 and the diode 50 are included to protect the cicuitry against accidental shorts. The STATUS BUS line 20 is monitored by each of the microprocessors 14 on their respective OMI module 2.

Figure 4:
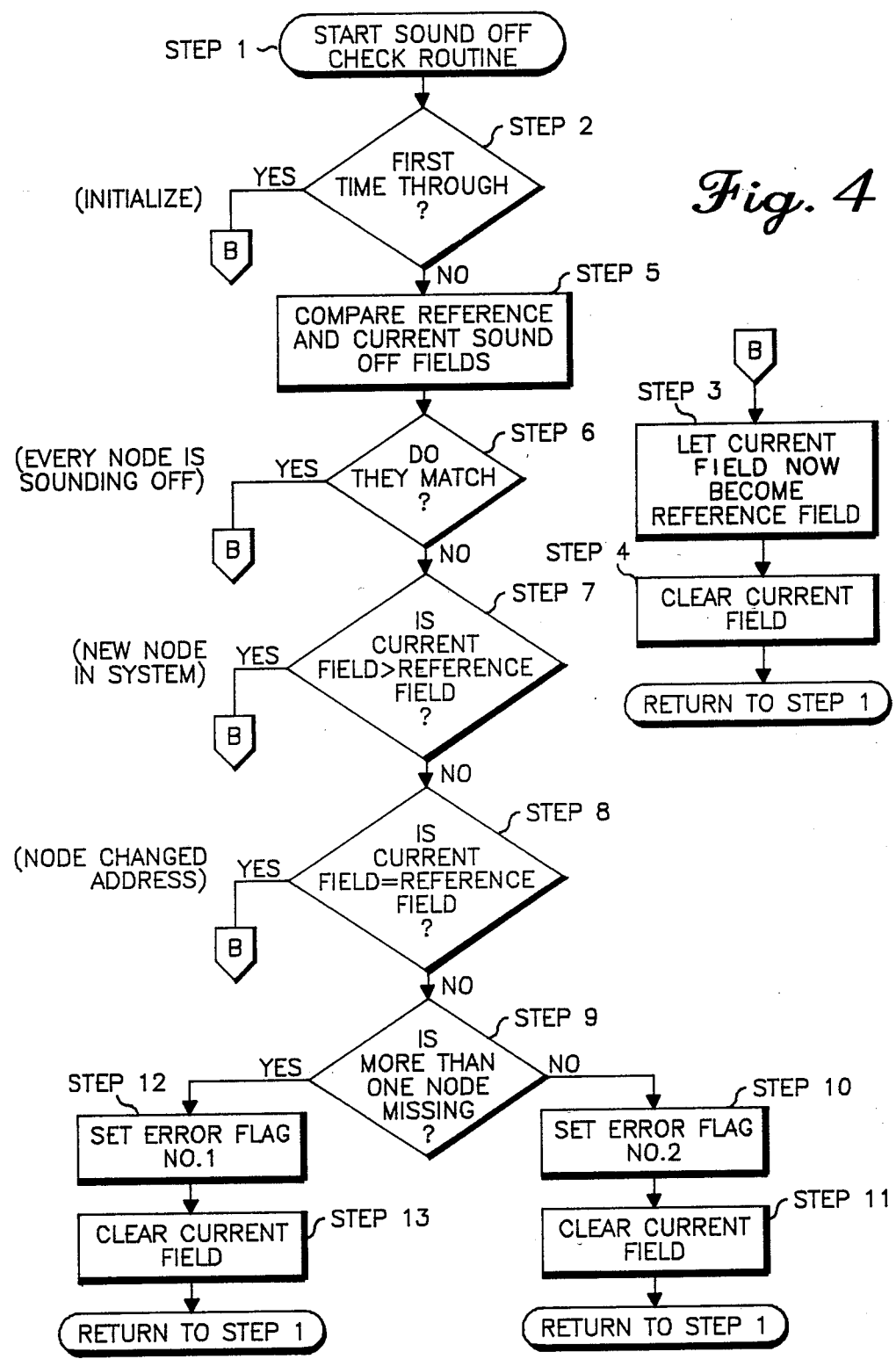
FIG. 4 is a flow chart illustrating an operation check routine for each of the microprocessors shown in FIG. 2.
Figure 5:
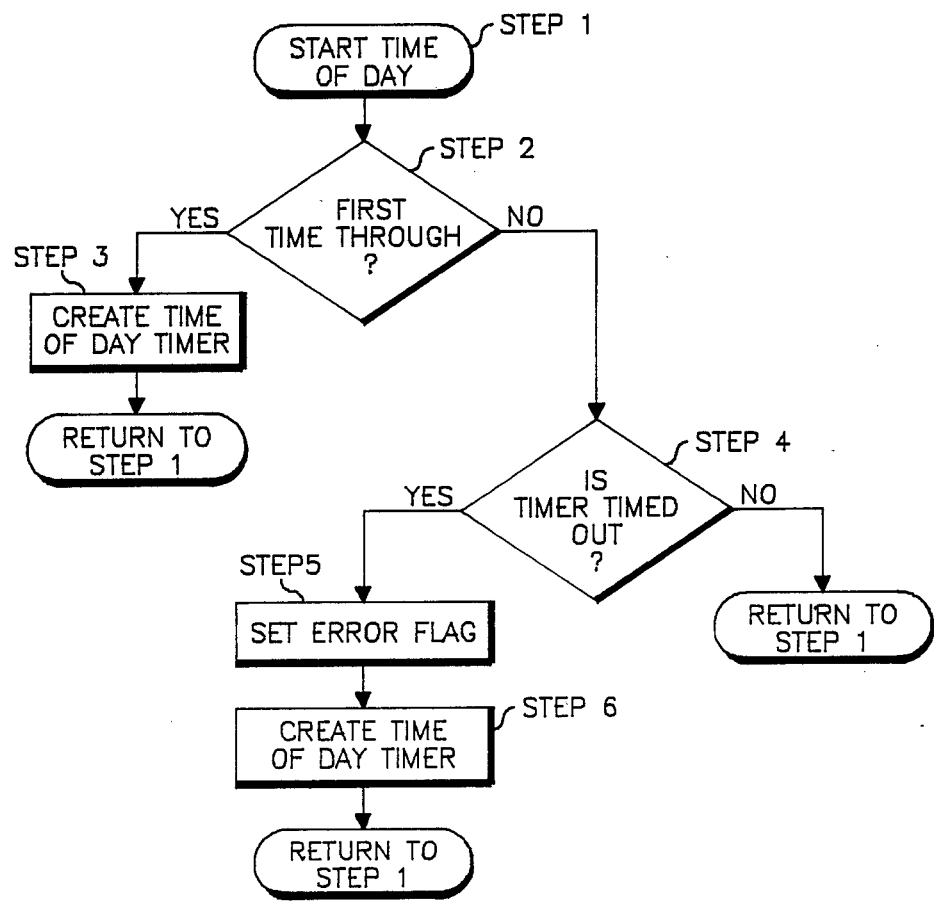
FIG. 5 is a flow chart illustrating a periodic switching routine for each of the microprocessors shown in FIG. 2.

Each of the microprocessors 14 includes an executive diagnostic routine which looks for errors found by other diagnostic routines, an operation check routine which checks for signals from all of the other modules in the system as an indication of the operation of the active MUX common module 8 or 10 and a periodic switching routine or time of day routine to monitor the length of time a particular MUX common module 8 or 10 has been active. The flow charts for the aforesaid programs performed by each of the microprocessors 14 are illustrated in FIGS. 3, 4 and 5, respectively and will be described in detail later.

When the microprocessor 14 detects an error which indicates a failure in the active MUX common module 8 or 10, it interrogates the STATUS BUS line 20 of determine whether the MUX common A module 8 or the MUX common B module 10 is active. It then adjusts its vote output signal to vote that the inactive or standby MUX common module 8 or 10 be activated. In this embodiment, a high logic level signal of 12 Volts is outputted to vote for the MUX common A module 8 and a low logic level signal of 0 Volts is outputted to vote for the MUX common B module 10. Assuming for example that the MUX common A module 8 is active, the STATUS BUS line 20 would therefore be indicating a low logic level. Then, if a failure occurs in the MUX common A module 8, each of the microprocessors 14 of the OMI modules 2 should detect the failure and interrogate the STATUS BUS line 20 to determine that the MUX common A module is currently active. Each of the microprocessors 14 would then respond by adjusting its vote output to the low logic level indicating a vote to activate the MUX common B module 10.

The actual voltage on the VOTE BUS line 22 is determined by superposition of the vote output signals from all of the microprocessors 14 in the system. In the case where all of the microprocessors 14 determine that the MUX Common A module 8 should be active, each of them would output a high logic level signal of 12 Volts and the VOTE BUS Line 22 would have a level of 12 Volts. Conversely, in the event that all of the microprocessors 14 determine that MUX Common B module 10 should be active, each of them would output a low logic level signal of 0 Volts and the VOTE BUS line 22 would have a level of 0 Volts. However, it is conceivable that not all of the microprocessors 14 will generate the same vote output and, therefore, since each vote output signals has the same output impedance of 4.7 Kohms, the following formula expresses the voltage on the VOTE BUS line 22 for any given combination of vote output signals:

$$V_{VB} = 12 \times A \qquad (1);$$

where $V_{VB}$ is the voltage on the VOTE BUS line 22;
A is the number of active (i.e., from OMI modules which have not removed themselves from the system) microprocessors 14 voting for the MUX Common A module 8 expressed in percent (%); and
12 is the high logic level voltage expressed in volts.

A majority vote for MUX Common A module 8 can, therefore, be recognized as a voltage greater than 6 Volts on the VOTE BUS line 22 by the application of equation (1). On the other hand, a majority vote for MUX Common B module 10 can be recognized as a voltage less than 6 Volts on the VOTE BUS line 22.

The VOTE BUS line 22 is monitored by the vote collecting circuitry on the MUX common A module 8 comprised of the comparator 23 and associated resistor 24 and capacitor 34. The voltage on the VOTE BUS line 22 is first filtered by the resistor 24 and capacitor 34 combination to remove any noise components. The filtered signal is then routed to the positive input of the comparator 23. The negative input of the comparator 23 is biased to half of the supply by the equal value resistors 30 and 32. if the voltage on the VOTE BUS line 22 exceeds half supply indicating that a majority of the microprocessors 14 have voted for the MUX common A module 8, then the output of the comparator 23 will swing high indicating that the plus terminal is more positive than the negative terminal. Similarly, the output will swing low if the voltage on the VOTE BUS line 22 is below half supply indicating that a majority of the microprocessors 14 have voted for the MUX Common B module. The resistor 28 is used to provide positive feedback in order to create a small amount of hysterisis which prevents the comparator 23 from oscillating in the event that the VOTE BUS line 22 is substantially equal to half-supply. When the output of the comparator 23 is at a high logic level, the MUX common A module 8 is enabled by the inverter circuit formed by the transistor 36 having the base resistors 38 and 40 and the collector resistor 42, at the terminal C. When the output of the comparator 23 is at a low logic level, the MUX common A module 8 is similarly disabled at the terminal C. Thus, in the preferred embodiment, a majority (i.e., more than 50%) of the microprocessors 14 must vote for the desired MUX common module, that is, the collective vote must be more than 50% before it will be activated. However, it should be readily apparent to those skilled in the art that the comparator circuit 23 could be replaced with other components such as a microprocessor such that any predetermined number of votes could be selected to transfer the operation from one MUX common module to another.

STATUS BUS line 20 is also monitored by the transistor 68 on the MUX common B module 10. When the STATUS BUS line 20 is at a high logic level, the transistor 68 is turned ON through the passive network connected to its base. This activates the MUX common B module 10 by the existence of the enable signal at the D terminal on the collector of the transistor 68. When the STATUS BUS line 20 is at a low logic level, the transistor 68 is turned OFF which then disables the MUX common B module 10.

It should also be noted that each of the microprocessors 14 vote to switch the MUX common modules 8 or 10 periodically as well as when a failure is detected as mentioned earlier and illustrated in the flow chart of FIG. 5. This periodic switching prevents the possibility of an ordinarily undetected failure in the inactive module. It should also be noted that the vote collecting circuitry including the comparator 23 is independent from the normal operational circuitry of the MUX common module. Therefore, a single point failure in the vote collecting circuitry although perhaps preventing the switching process will still leave a correctly functioning MUX common module 8 or 10 controlling the system. Furthermore, the vote collecting circuitry failure would be detected when the STATUS BUS line 20 fails to change following a scheduled vote to switch.

Figure 3A:
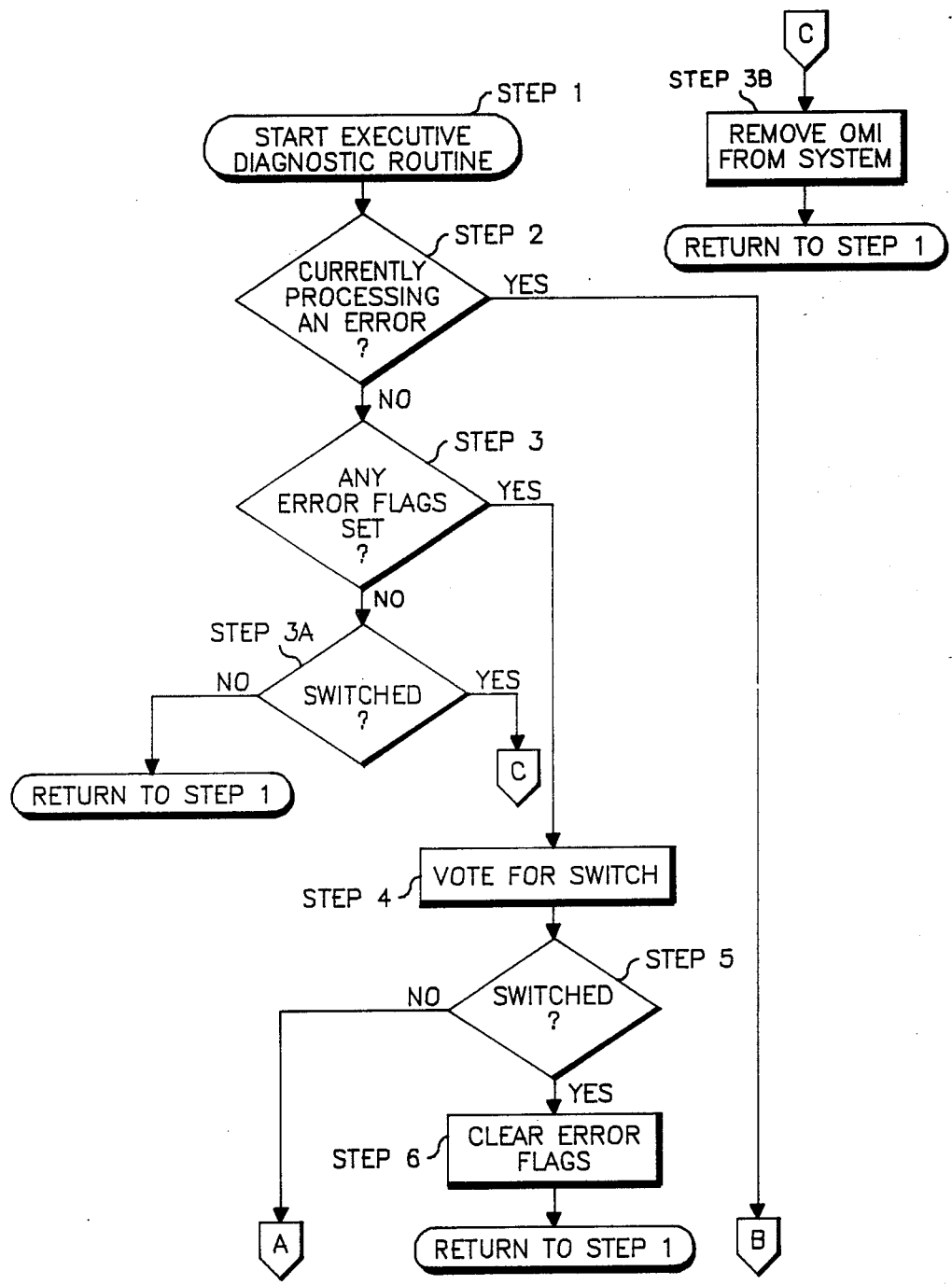
FIGS. 3A and 3B are flow charts illustrating the executive diagnostic routine for each of the microprocessors shown in FIG. 2.
Figure 3B:
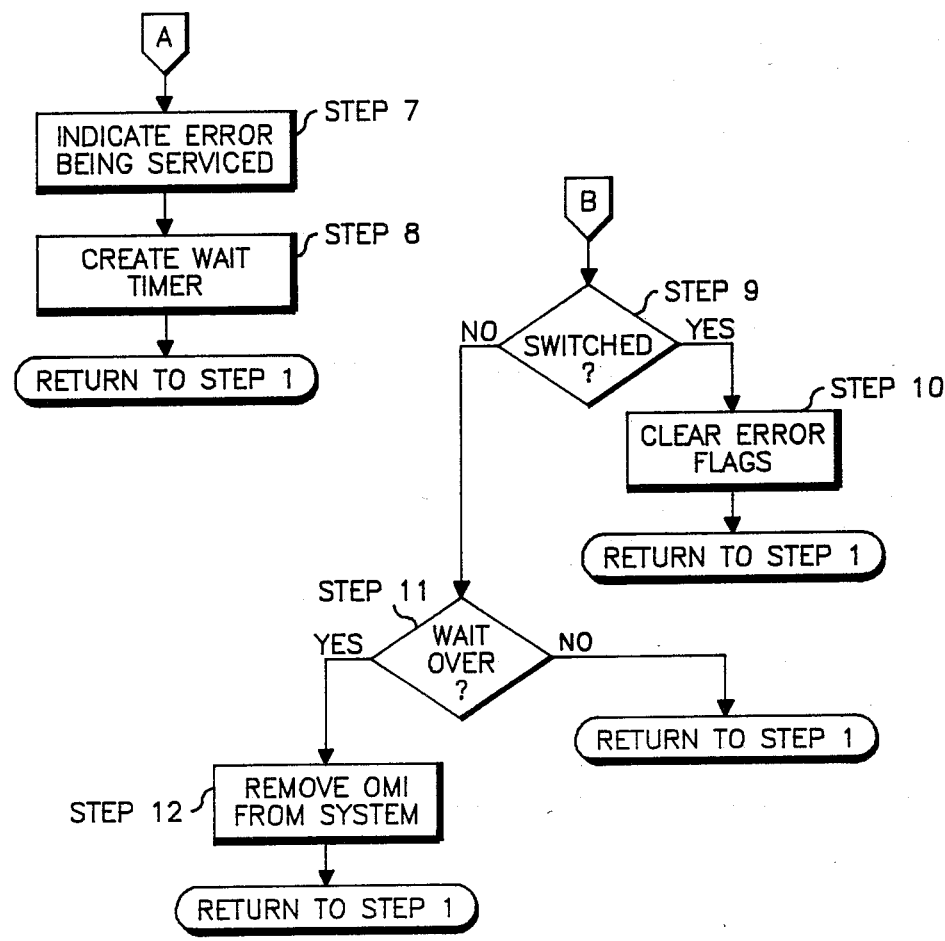

Referring now to FIGS. 3A and 3B, a flow chart illustrating the executive diagnostic routine for each of the microprocessors shown in FIG. 2 will be described. It should be noted that the executive diagnostics routine is used to monitor other routines which are designed to detect failures in the MUX common A module 8 or MUX common B module 10. Upon detection of a failure in the active MUX common module 8 or 10, the executive diagnostics routine causes the microprocessors 14 to output a vote signal with the polarity necessary to enable the currently inactive MUX Common module. In step 1, the operating system for the microprocessors 14 allows the executive diagnostics routine to start operation and proceed to step 2 where it is determined if the executive diagnostics routine is currently processing an error. If no error is currently being processed, the routine proceeds to step 3 to check if any error flags are set. The error flags would be set in the event that one of the other diagnostic routines such as the operational check routine has detected an error. If no error flags are set, the program proceeds to step 3A to determine if a MUX common module switch has occurred. If no switch has occurred, the program returns to step 1; but, if a MUX Common module switch has occurred, the program proceeds to step 3B where the OMI module stops its operation and removes itself from the system by activating the tristate control lead on the control buffer 16 so that its output becomes a high impedance as previously described in greater detail with respect to FIG. 2. Returning to step 3, if an error flag is set, the program proceeds to step 4 where it is determined that the microprocessor must vote for a MUX common module switch. When this is determined, the microprocessor 14 reads the STATUS BUS line 20 to determine which of the MUX common modules 8 or 10 is active and then generates an output signal to vote for a switch from the failed MUX common module. After step 4 has been executed, the routine proceeds to step 5 where a determination is made as to whether the MUX common module has been switched or not. The microprocessor 14 again is monitoring the STATUS BUS line 20 and simply determines if there has been a change in the state of the STATUS BUS line 20. If the MUX common module has been switched, the program proceeds to step 6 where the error flags are cleared and the routine then returns to step 1.

However, in step 5, if the MUX common modules have not been switched, the program proceeds to step 7 where it is indicated that an error is being serviced. This notice can be transmitted over the RS232 interface onto a printer to alert the operator of the error. The routine then proceeds to step 8 where a wait timer is established. The wait timer is established because there can be up to several seconds of skew between the times the different microprocessors 14 can check for the failure. Skew may be defined as the time period from when the first microprocessor generates an output vote until a majority of the microprocessors have generated the same output vote, since all of the microprocessors are running asynchronously with respect to one another. Thus, if this particular microprocessor happens to be the first one to detect a MUX Common module failure, then it has to wait for the skew period until all the microprocessors 14 have detected it, so that the majority have voted for the switch to another MUX common module. In this case the wait timer is set in the order of 5 seconds, equivalent to the approximate skew time of the system. After step 8, the routine returns to step 1 to start its cycle again.

Now assuming that an error is currently being processed, we proceed from step 2 to step 9 and again see if the MUX common module has yet been switched. If it has switched, indicating that the other microprocessors have detected the failure, have voted and the MUX common module was already switched over to another, the routine then proceeds to step 10 where the error flags are again cleared, at which time it returns to step 1.

However, if the MUX common module has not been switched to another, the program proceeds to step 11 to determine if the wait timer created in step 8 has yet timed out. If the wait timer has not yet trimed out the routine returns to step 1 and begins again; if the wait timer has timed out, the program proceeds to step 12 where the OMI module 2 stops its operation and removes itself from the system by activating the tristate control lead on the control buffer 16 so that its output becomes a high impedance as previously described in greater detail with respect to FIG. 2. The fact that the wait timer time had elapsed indicates that all of the other OMI modules had sufficient time to detect the failure, if one really existed, and that this one particular OMI module was the only one that detected the failure. This indicates that the OMI module has a problem and not the MUX common module. Therefore, the OMI removes itself from the system.

Referring now to FIG. 4, an operation check diagnostic program (hereinafter referred to as the sound off check routine) will be described. As mentioned hereinbefore, with respect to FIG. 1, the system is comprised of a plurality of nodes, each node having a particular module which may communicate with other modules via the BUS 12. For the sound off check routine, each of the modules is supposed to generate a sound off signal within a predetermined interval of time which may be read by all of the other microprocessors 14. The sound off check routine is run after the above-mentioned time interval has elapsed and is designed to determine if each of the modules has generated its sound off signal which indicates whether the MUX common module is operating properly or not.

In step 1, the sound off check routine is started and proceeds directly to step 2. In step 2, it determines whether this is the first time through the program or not. If it is the first time through the program, the routine proceeds to step 3 where the current field becomes the reference field. It should be noted that the current field may be represented by a number of bit positions at a particular address in RAM, each bit position corresponding to a respective sound off node in the system and being capable of being set with a binary one or zero. Thus, the field represents a binary sequence. The reference field also contains a number of bit positions corresponding to the number of nodes in the system, the field again representig a binary sequence. For example, if there are three nodes in the system, and the first node generates a sound off signal, a one is placed in the first bit position of the current field. Similarly, when the second and third nodes sound off a one will be placed in the second and third bit positions of the current field, respectively. When step 3 is completed the routine proceeds to step 4 where the current field is cleared and the routine then returns to step 1. Referring back to step 2, if it is not the first time through the routine, the program proceeds to step 5 where the reference field is compared with the current field. Once the current field is compared with the reference field, the program proceeds to step 6 where it is determined if the current field matches the reference field. If the current field does indeed match the reference field, the program proceeds back to step 3 where the current field becomes the reference field and the current field is then cleared and the routine returns to step 1 again. However, if in step 6 the current field does not match the reference field, the routine proceeds to step 7 to determine if the current field is greater than the reference field, that is "have additional nodes been added to the system?" If the current field is greater than the reference field, the program proceeds to step 3 where the current field becomes the reference field and the current field is cleared and the program returns back to step 1; however, if the current field is not greater than the reference field, the program proceeds to step 8 to determine if the current field is equal to the reference field (i.e., "Has the number of nodes remained the same?"). If the current field is indeed equal to the reference field, it indicates that a node has changed address and the routine proceeds again to step 3 where the current field becomes the reference field and the current field is cleared before returning back to step 1.

If the current field is not equal to the reference field, the program proceeds to step 9 to determine if more than one node is missing. If only one node is missing error flag #2 is set in step 10, the current field is cleared in step 11 and the routine returns to step 1 to begin again. However, if more than one node is missing the routine proceeds to step 12 where error flag #1 is set, the current field is cleared in step 13 and the routine returns to step 1 to begin again.

It should be noted that when either error flag #1 or error flag #2 is set, the executive diagnostic routine would then read the error flag and generate a vote for switching the operation of the MUX common module in accordance with the flow chart of FIG. 3.

As indicated earlier, the MUX common modules are periodically switched in order to detect any silent failure that may occur due to lack of use. Each of the microprocessors 14, therefore, include a time of day routine as illustrated in FIG. 5. In step 1, the time of day routine is started and proceeds to step 2 to determine if the microprocessor 14 has just been powered up. If it is the first time through the routine, the program proceeds to step 3 where a time of day timer is created, and the program than returns to step 1. In step 2, if it is not the first time through, the program proceeds to step 4 to determine if the the time of day timer has yet timed out. If the time of day timer has timed out, the program proceeds to step 5 where an error flag is set to be read by the executive diagnostic routine. The routine then proceeds to step 6 where a time of day timer is again created before returning to step 1 to begin the time of day routine again. However, in step four if the timer has not yet timed out the program returns back to step 1 to begin its cycle again.

In summary, a unique method and apparatus for selecting at least one of a plurality of redundant common modules has been illustrated wherein a plurality of distributed system components continually diagnose the operation of at least one active redundant common module, and each system component generating a vote at a system node for a particular redundant common module and another redundant common module being selected for operation when a predetermined number of votes indicates such a change.

Obviously, numerous (additional) modifications and variations of the present invention are possible in light of the above teachings. It is therefore to be understood that within the scope of the appended claims, the invention may be practiced otherwise than specifically described herein.

What is claimed is:

1. A system for the selection of at least one redundant module from a plurality of redundant modules, comprising:

a plurality of voting means, each of said voting means coupled to each of the redundant modules for diagnosing the operation of an active redundant module from said plurality of redundant modules and for generating a vote indicating either to transfer operation from said active redundant module or to retain operation of said active redundant module, said plurality of voting means being cooperatively intercoupled such that each respective vote generated combines to form a collective vote;

control means, connected to said plurality of voting means and said plurality of redundant modules, for receiving said collective vote of said plurality of voting means and for selecting one of said plurality of redundant modules to be active in accordance with said collective vote.

2. A system, according to claim 1, wherein each of said voting means comprises:

failure detecting means for detecting a failure of said active redundant module and for causing said voting means to generate a vote indicating to transfer operation from said active redundant module to another redundant module.

3. A system, according to claim 1, wherein each of said voting means comprises:

timer means for timing the duration of operation of said active redundant module and causing said voting means to generate a vote indicating to transfer operation from said active redundant module to another redundant module from said plurality of redundant modules whenever a predetermined time period has elapsed.

4. A system, according to claim 2, wherein each of said voting means comprises:

timer means for timing the duration of operation of said active redundant module and causing said voting means to generate a vote indicating to transfer operation from said active redundant module to another redundant module from said plurality of redundant modules whenver a predetermined time period has elapsed.

5. A system according to claim 2, wherein each of said failure detecting means comprises:

means for detecting a failure in said respective voting means, including removal means disposed between said respective voting means and said cooperatively intercoupled plurality of voting means for removing said respective voting means in response to said detecting means.

6. A system, according to claim 1, wherein each of said voting means comprises:

a microprocessor.

7. A system, according to claim 1, wherein said control means comprises:

means for receiving said collective vote from said plurality of voting means and for generating an output indicative of said collective vote; and switching means, connected to said receiving means, for switching the operation from an active redundant module to another redundant module in response to the collective vote from the output of said receiving means.

8. A system, according to claim 7, wherein said switching means comprises:

status means, connected to said plurality of voting means, for indicating which redundant module is active.

9. A system, according to claim 7, wherein said receiving means comprises:

a comparator for comparing the collected votes with a predetermined value to determine the collective vote.

10. A system, according to claim 6, wherein said control means comprises:

a status bus, connected to an input of each said microprocessor;

a vote bus, connected to an output of each said microprocessor, on which the votes from said plurality of microprocessors are superposed to indicate a collected vote;

a comparator having an input connected to said vote bus, for comparing the collected vote to a predetermined value and generating a collective vote signal for selecting a redundant module to be active;

a switching circuit, connected to said comparator and responsive to said collective vote signal for enabling said selected redundant module and disabling said non-selected redundant modules; and a status circuit, connected to said switching circuit and said status bus for generating a status signal which indicates which redundant module is active.

11. A method of selecting at least one redundant module from a plurality of redundant modules, comprising the steps of:

diagnosing the operation of an active redundant module with a plurality of voting means coupled to each of the redundant modules;

generating a collective vote from said plurality of voting means with respect to the operation of said active redundant module; and selecting one of said plurality of redundant modules to be active in accordance with said collective vote.

12. A method, according to claim 11, wherein the step of selecting further comprises the step of:

transferring the operation from said active redundant module to another one of said plurality of redundant modules whenever said collective vote indicates a preselected number of said plurality of voting means have detected a failure of said active redundant module or have detected the expiration of a predetermined time period since said active redundant module became active.

13. A method of selecting at least one redundant module from a plurality of redundant modules, comprising the steps:

diagnosing the operation of an active redundant module with a plurality of microprocessors;

generating a vote signal from each microprocessor of said plurality of microprocessors which indicates the respective diagnosed condition of said active redundant module;

combining the vote signals from said plurality of microprocessors whereby a collected vote signal is obtained;

comparing said collected vote signal with a predetermined value whereby one of a first condition and a second condition is determined;

retaining the operation of said active redundant module whenever said first condition is determined and transferring the operation from said active redundant module to another redundant module whenever said second condition is determined.

* * * * *